Dec. 19, 1950     C. F. KANTOLA     2,534,452
WATER SUPPLYING AND DISTRIBUTING
MEANS FOR LOCOMOTIVE TENDERS
Original Filed July 6, 1944     6 Sheets-Sheet 1
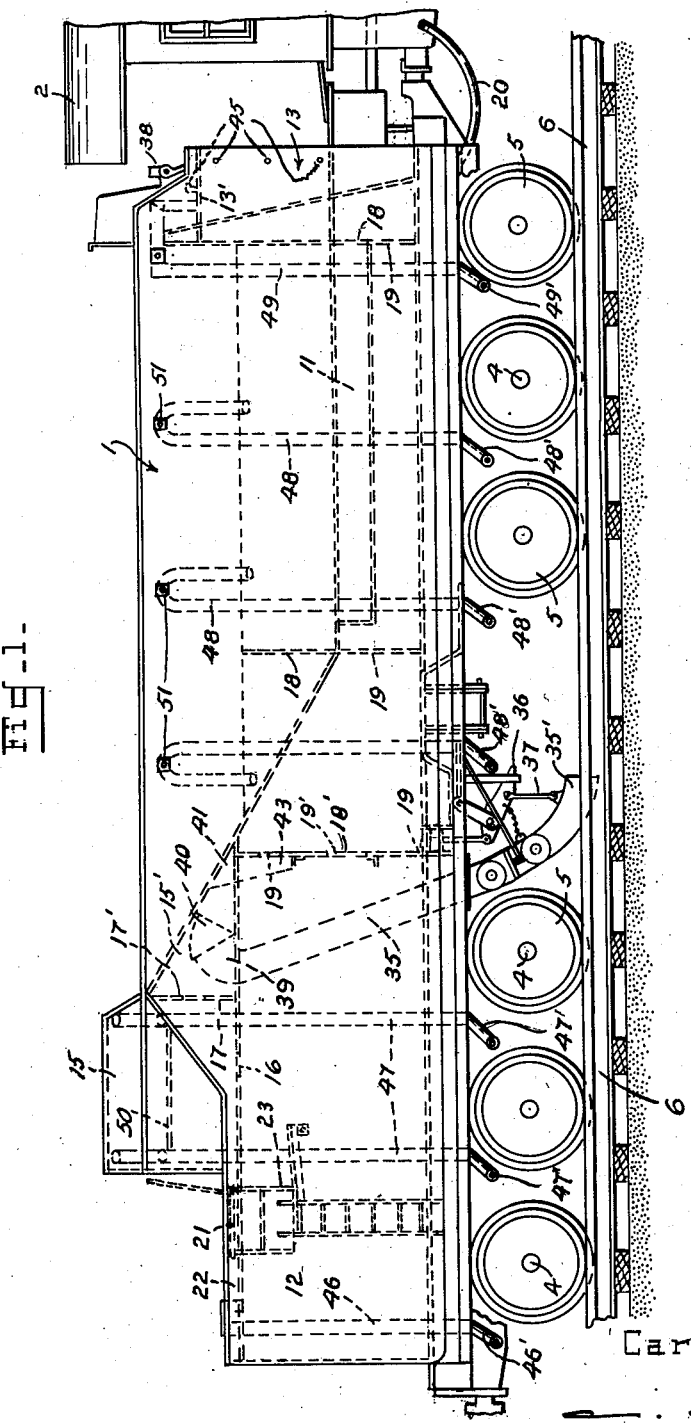
Inventor:
Carl F. Kantola,
By     Attorney.

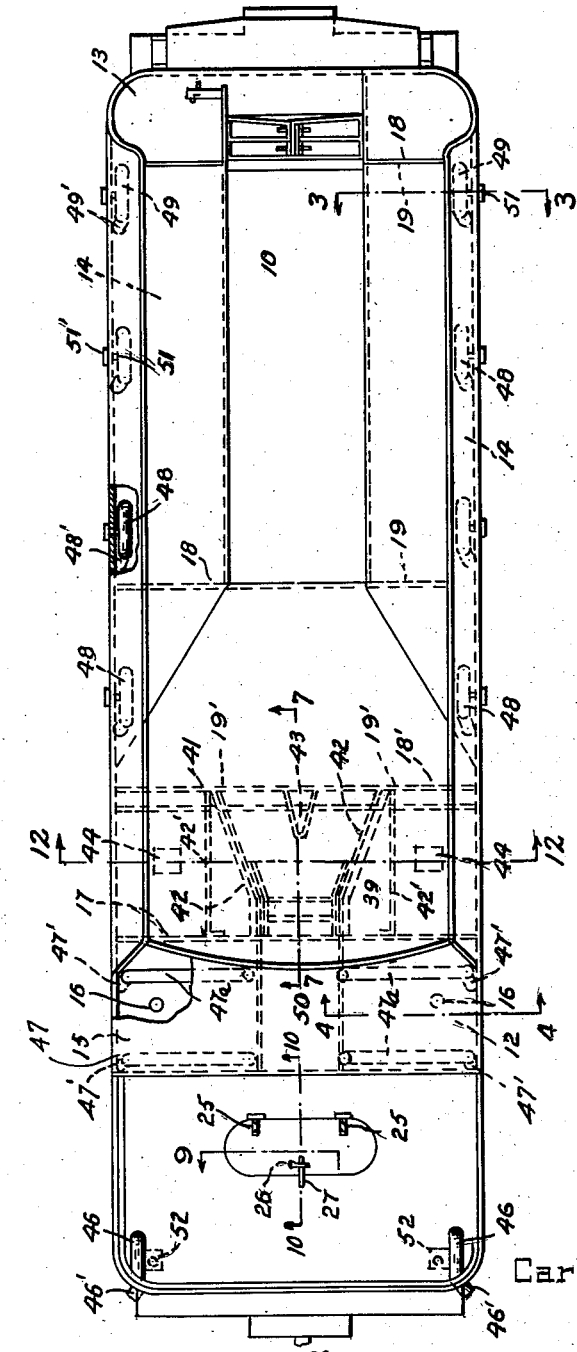

Dec. 19, 1950     C. F. KANTOLA     2,534,452
WATER SUPPLYING AND DISTRIBUTING
MEANS FOR LOCOMOTIVE TENDERS
Original Filed July 6, 1944     6 Sheets-Sheet 3
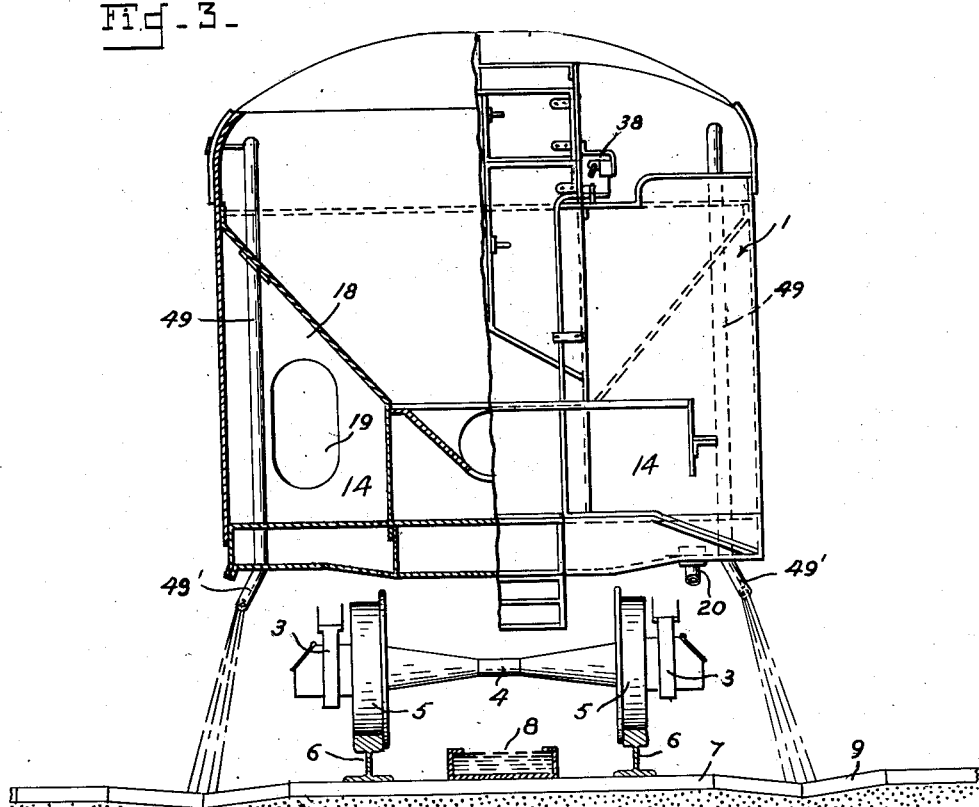
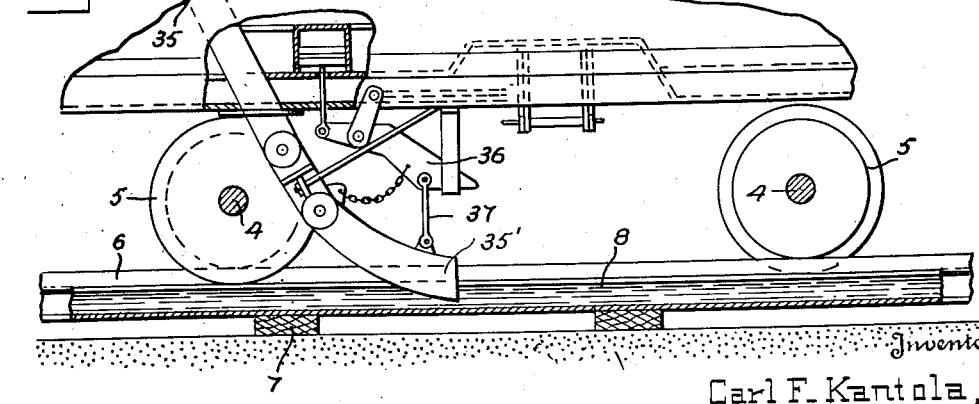
Inventor:
Carl F. Kantola,
By C. C. Hines,
Attorney.

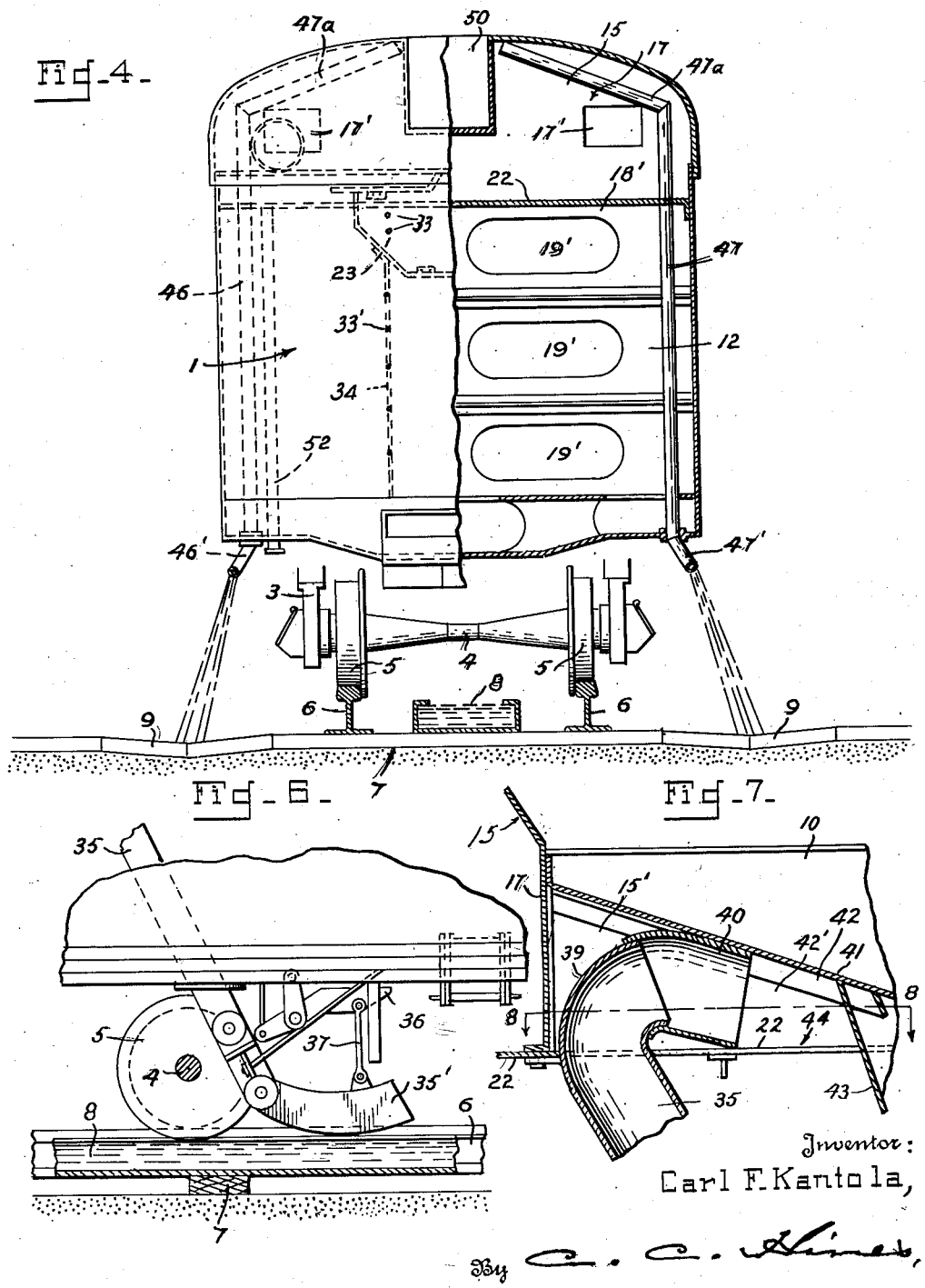

Dec. 19, 1950     C. F. KANTOLA     2,534,452
WATER SUPPLYING AND DISTRIBUTING
MEANS FOR LOCOMOTIVE TENDERS
Original Filed July 6, 1944     6 Sheets-Sheet 5
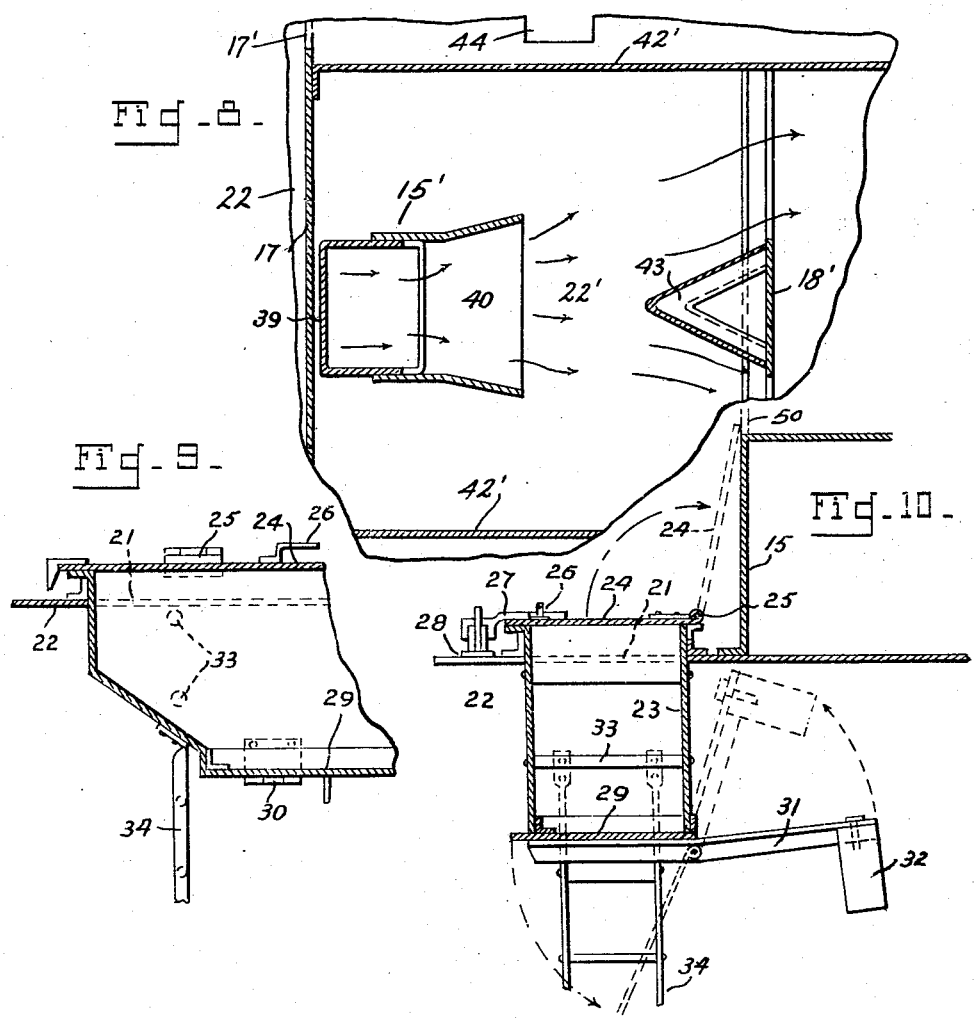
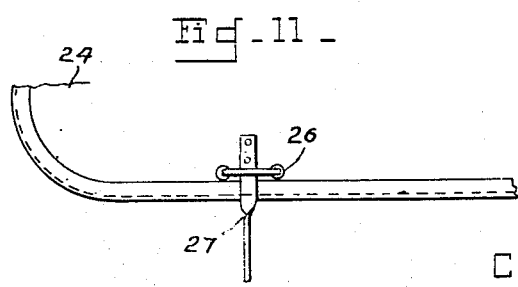
Inventor:
Carl F. Kantola,
By C. C. Hines,
Attorney Dec. 19, 1950 C. F. KANTOLA 2,534,452
WATER SUPPLYING AND DISTRIBUTING
MEANS FOR LOCOMOTIVE TENDERS
Original Filed July 6, 1944 6 Sheets-Sheet 6
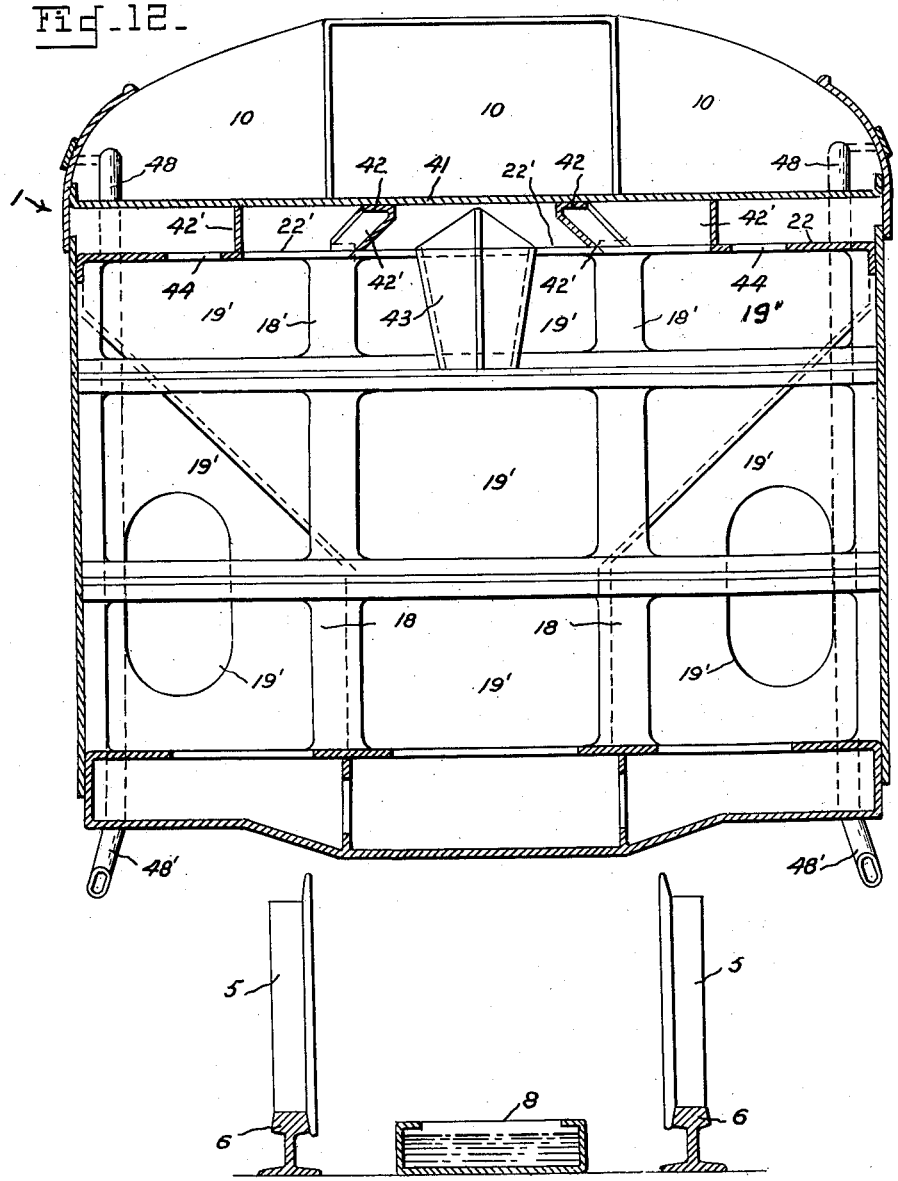
Inventor:
Carl F. Kantola,
By C. C. Hines,
ATTORNEY.

Patented Dec. 19, 1950

2,534,452

UNITED STATES PATENT OFFICE 2,534,452

WATER SUPPLYING AND DISTRIBUTING MEANS FOR LOCOMOTIVE TENDERS

Carl F. Kantola, Dumont, N. J.

Original application July 6, 1944, Serial No. 543,709. Divided and this application August 16, 1946, Serial No. 691,139

18 Claims. (Cl. 105—236)

1

This application is a division of my prior application, Serial No. 543,709, now Patent No. 2,438,397, dated March 23, 1948.

This invention relates to improvements in locomotive tenders and particularly to water supplying and distributing means for such tenders.

In my aforesaid Patent No. 2,438,397 I have shown a locomotive tender provided with rear, front and side water chambers, a scoop for taking up water from a track-pan and delivering it to the rear water chamber, an expansion or surge chamber communicating with and adapted to receive air and water from the rear water chamber, a divider operating in conjunction with the scoop and tender walls to spread the force of and to guide and deflect the water from the scoop toward and distribute it to the water chambers, a top filling inlet communicating with the rear water chamber for filling the tender from a water column, said inlet having a normally closed, automatically closing closure member acting as a check valve, opening under the weight of water, when water is taken from a water column, and closing under the action of its closing means and the pressure of the water in the rear water chamber when scooping, against the escape of water through the filling inlet and to allow the pressure in said chamber and in the expansion chamber to build up to facilitate the rapid distribution of the water to water chambers, and air venting and water overflow means operating to allow controlled escape of air from the water and expansion chambers to permit the tender to be filled to the desired maximum level and to permit of the discharge of overflow water.

The present invention relates to the water supplying means and coacting water distributing means referred to, and one of its objects is to provide novel and improved means particularly designed for cooperation with the scoop when scooping to effect the rapid distribution of the water to the water chambers of the tender.

Another object of the invention is to so construct the tender and the scoop that the water, forced through the scoop and into the tank under high pressure of a fast-moving train, will be prevented from damaging the tank or other portions of the tender.

Still another object of the invention is to provide a construction whereby the incoming water flowing from the upper end of the scoop will be divided and spread in such manner that its force will be reduced and damage by water under high pressure eliminated.

Still another object of the invention is to pro-

2 vide a novel construction of means for preventing undue and undesirable surging of the water in the water chambers while being filled and while the tender is in motion.

In the accompanying drawings:

Fig. 1 is a side elevation of the improved tender.

Fig. 2 is a top plan view of the tender.

Fig. 3 is a view looking at the front end of the tender with a portion thereof in vertical section, the section being taken substantially on line 3—3 of Fig. 2.

Fig. 4 is a view looking at the rear end of the tender with a portion thereof in vertical section, the section being taken substantially on line 4—4 of Fig. 2.

Fig. 5 is a fragmentary view showing the water scoop lowered and entering the water pan or trough of the track.

Fig. 6 is a view similar to Fig. 5, showing the scoop raised.

Fig. 7 is a fragmentary sectional view taken substantially on line 3—3 of Fig. 2 showing the upper portion of the water scoop pipe and adjacent portions of the tender.

Fig. 8 is a fragmentary sectional view on the line 8—8 of Fig. 7.

Fig. 9 is a fragmentary vertical sectional view taken substantially on line 9—9 of Fig. 2 through an inlet provided at the top of the water space of the tender to accommodate a spout for an overhead tank at a station.

Fig. 10 is a vertical sectional view on line 10—10 of Fig. 2 taken at right angles to Fig. 9.

Fig. 11 is a view looking down on the cover for the upper filler opening of Figs. 9 and 10.

Fig. 12 is a vertical transverse section on an enlarged scale through the tender taken substantially on line 12—12 of Fig. 2, looking forwardly toward the slope sheet and rear bulkhead between the rear and side water chambers, portions of the scoop located below the tender being omitted.

In the accompanying drawings, the tender, which is indicated in general by the numeral 1, is shown coupled to an engine 2 and is equipped with the usual trucks 3 carrying axles 4 and wheels 5 for resting upon and rolling along the rails 6 of a track 7. A scoop pan 8 extends longitudinally of the track between the rails and, at opposite sides of the track, are gutters 9 for catching water which may overflow when the tender is filled with water scooped from the pan 8.

The tender has the usual fuel space 10 and conveyor compartment 11, from which fuel is delivered to the firebox of the locomotive. There has also been provided a rear water compartment 12 and a front water compartment or tank 13 which are connected with each other by side tanks or compartments 14. Over the rear water compartment and back of the fuel space 10 is an expansion tank 15 which rises to a predetermined level higher than the water compartments and which has communication with the rear tank through drain openings 16 and has its forward portion 15', which is of gradually reduced height, set off from its main portion by vertically disposed transversely extending plates 17 having openings 17' therein so that water may flow in the expansion tank longitudinally of the tender. Bulkheads 18, 18' are respectively provided in the rear tank and the side tanks to check surge of water longitudinally of the tender, and are respectively formed with openings 19, 19' in order that water may flow from one tank to another and maintain an even level in the tanks. The usual pipe 20 is provided for delivering water from the tender to the boiler of the locomotive engine.

A filling opening 21 is formed through the top wall 22 so that the water compartments or tanks may be filled from an overhead tank at a station along the track by a spout thrust inwardly through the filling opening. Through this filling opening passes a funnel 23 which tapers downwardly to a small outlet at its lower end and has its upper portion projecting upwardly through the filling opening 21 and normally closed by a cover 24. This cover is hinged at its front end by hinges 25 so that it may be swung upwardly to open position, and, at its free rear edge, carries a handle 26 for swinging the cover to raised position and a latch 27 for engaging a keeper 28 and securing the cover closed. The reduced opening at the lower end of the funnel is normally closed by a gate 29 having a hinge mounting 30 at its front edge so that it may swing vertically from raised or closed position against the lower end of the funnel, to lowered or open position. A bar or arm 31 extends from the hinged end of the gate and carries a weight 32 which urges the gate upwardly and normally holds it closed. When a filling spout of an overhead tank is thrust into the funnel through the upper end thereof, the force of water flowing from the spout will open the gate and, when the spout is withdrawn, the weight will return the gate to its closed position. The funnel also serves as a manhole through which a workman may enter the water chamber 12 for inspecting, cleaning, or repairing the same, and, in order that the workman may readily descend and climb out of the water chamber, there has been provided rungs 33 in the funnel and a ladder 34 which is attached to and extends downwardly from the funnel at a side thereof. It will thus be seen that the water chambers of the tender may be filled from an overhead tank of the type commonly provided at stations along a railway track.

In order that the water chamber may be filled from the water pan 8 as the train moves along the track, there has been provided a diagonally extending filling pipe 35 having a forwardly curved scoop 35' at its lower end. This scoop is pivotally mounted for swinging movement from raised or inoperative position, as shown in Fig. 6, to the lowered position of Fig. 5, and is connected with a lifting arm 36 by a link 37. Conventional mechanism is employed for operating the lifting arm to raise and lower the scoop and includes an operating valve 38 mounted at the front of the tender, where it may be conveniently reached by an engineman. When the scoop is lowered, it extends into the water pan or trough, and since the tender is moving forwardly, water will pass upwardly through the pipe 35 to the upper end thereof where it is discharged through the forwardly projecting elbow 39 and the discharge spout or nozzle 40. The nozzle 40 is located in the space 15' between plates 42' with plate 17 at its rear and deflecting irons 42 at its sides and extends under the rear slope sheet or plate 41 of fuel space 10 with the plate 22 cut away as at 22'' between plates 42' and back to plate 17 so that water can flow unrestrictedly from the nozzle 40 downwardly and forwardly at an angle parallel to and against the sloping plate or rear wall 41 of the fuel space. Openings 44 are formed through plate 22 for air and water to rise into the sloping section 15' of the expansion chamber and then through the openings 17' of plates 17 into the expansion chamber 15, thereby retarding rise of water in the expansion chamber until the main chambers have been filled to the desired high level and providing for the reception of the air to prevent air resistance to the filling of the chambers to such level. The stream of incoming water discharged from the nozzle 40 strikes a divider 43 which is V-shaped in cross section and tapers downwardly as well a forwardly. Since the incoming stream of water is spread by the divider, its force is directed downward and forward so that it will flow into the water chamber or compartment 12 and through the bulkhead openings 19 into side compartments 14 and to the front of tanks 13 through forward bulkhead 18 and openings 19 therein. Therefore, damage will not be done to the walls of the tender by the incoming water which is discharged from the nozzle 40 under very high pressure when the tender is traveling at high speeds, viz., 60 to 80 miles per hour or more. The water fills the rear chamber 12, the side chambers 14, and the front chamber 13, and, in order that tests may be made to determine if the water chambers need filling, there have been provided a number of test cocks 45 located at different levels at one side of the front of the tender, where they may be opened by an engineman making the test.

Overflow pipes 46, 47, 48 and 49 are disposed vertically at their sides of the tender and have their upper ends communicating with the water chambers and the expansion chamber and their lower ends passing through the bottom of the tender and terminating in nozzles or spouts identified by primed numerals corresponding to the identifying numbers of the pipes. Upper ends of the pipes 46, 48 and 49 have reversed, downwardly extending elbows with inlet ends communicating with the water chambers below their return bends, and the upper end portions of the pipes 47 are bent laterally as shown at 47a and extend at an upward incline toward the center of the expansion tank at its highest level and terminating close to side walls of a channel 50 formed across the top of the expansion chamber, the bottom wall of which forms a walkway, so that trainman may easily cross the expansion tank when walking along the top of the tender. The nozzles or spouts at the lower ends of the pipes extend rearwardly at a downward incline, as shown in Fig. 1, and, referring to Figs. 3 and 4, it will be seen that these nozzles are also deflected to project outwardly at opposite sides of the tender. Therefore, when water flows through the overflow pipes, it will be discharged rearwardly of the tender at a downward incline and outwardly from opposite sides of the tender so that it will be deposited in the gutters 9 at the sides of the track. In view of the fact that the transversely bent upper ends of the pipes have syphon-breakers 51 and shield 51' therefor, the water tanks or compartments will not be liable to be emptied. When water overflows from the tender, due to overfilling of the compartments, or surging, it flows downwardly through the pipes 10 and since it is discharged below the tender, and laterally therefrom into the gutters, formation of ice upon the tender will be prevented, and damaging overflow from the top vents formerly used is eliminated. It should also be noted that air which would normally be trapped in the chamber by inrushing water is discharged through the overflow pipes, thus eliminating back pressure and allowing a greater amount of water to be scooped and eliminating damage to the tank by excessive pressure of air and water. When surging occurs, the water enters the expansion chamber and then flows back into the main water chamber 12 at the back of the tender. In case any water collects upon the top of the rear water chamber, it will drain therefrom through the drain pipes 52 located at rear corners of the tender near the pipes 46.

The present invention has been designed for the purpose of allowing rapid filling of the tender with water when the tender is traveling at high train speeds, in such manner as to reduce waste of water while preventing bulging or disruption of walls or leak-straining of seams of walls or other damage to the tender, its running gear or to the trackway, or damage to a following car or to cars traveling on other tracks and passing the tender while it is being filled by scoop operation, by which the water is being delivered in large volume and under great pressure liable to cause such damage unless the water is properly distributed throughout the water compartments immediately on delivery and unless dangerous pressures from air and excessive water supply are relieved. Excessive supply is particularly likely to happen at the higher speeds of from 60 to 80 or more miles per hour and to cause abnormally high pressures particularly if the pickup action of the scoop begins when the water compartments are from one-half to two-thirds full, and the apparatus must therefore function to rapidly distribute the water to the compartments and to give highly effective overflow and pressure relief actions in order to prevent damages of the character referred to.

The present invention has also been designed to facilitate the distribution of the water to the water chambers of the tender with greater facility and with a material saving of time when the tender is filled from an overhead tank.

The speed of travel of high speed trains, those traveling at the rate of 45 to 60 miles per hour, and particularly those traveling at the rate of from 60 to 80 miles per hour or higher, as well as the larger sized locomotives and tenders employed in high speed trains and the amount of water carried and consumed, make it necessary to use means whereby the tender may be rapidly replenished with water without using a track pan of abnormal length and in order to prevent loss of time so that a high speed schedule may be maintained. The use of a water scoop enables the operation of replenishing the tender to be carried out while a train is traveling and without reduction of speed. To meet service conditions, however, it is necessary also to provide the tender with a top filling inlet whereby it may be replenished with water from a water column at high pressure and in large volume to enable the tender to be quickly filled while standing at water stations. In the operation of filling from either a water column or water scoop, it is desirable or essential to provide means to permit the air pressure to escape sufficiently and without water waste to effect quick distribution of the water throughout the water chambers while permitting overflow of excess water when the tank is filled as well as to permit escape of air at the proper time to prevent dangerous over-pressure and to allow the tank to be filled to the desired maximum level. In order to secure these results when a scoop is used the top filling opening must be kept sealed against the discharge of air and water and against the forcible opening of its closure means under pressure while the pressure in the region thereof is building up to the desired degree to effect quick distribution of the water.

Prior to and during the stages of development of my invention, in tests conducted for the purpose on the locomotive tenders of a well-known railroad, it was found that at the higher speeds named water began to be discharged from vents in the vertical wall immediately back of the fuel space within two or three seconds after the scoop had been dropped into the pan and soon thereafter the water began to spray out from under the cistern cover with evidence of considerable pressure. The top of the tank back of the coal space was soon filled with water which then splashed over the side coping in waves, providing water in sufficient body to account for reported damages of the kind mentioned. Indeed, at the higher speeds the pressure was so great that the lock of the cistern cover was forced and the cover blown open, to release an on-rushing column of solid water discharging through the filling opening. It was also found that interior damages were caused by surging and excess pressure and damage to the wheel bearings and other parts of the running gear of the tender and to the track through displacement or the washing out of ballast.

These difficulties and disadvantages have been avoided and ocercome by my novel construction and combination of parts for effecting rapid distribution of the water by providing water dividing and air pressure reducing means to direct and cause proper distribution of the water to the water spaces of the tender, by the provision of means for sealing the top water inlet while scooping to allow the air pressure to escape and water to fill the tank to the maximum level, and by the provision of means for permitting excess water and air under pressure to escape at the proper time and discharging the excess water without damage to the tender running gear or to the trackway. The divider 43 is provided to check the force of the water flowing from the outlet 40 of the conductor 35 and to divide the stream for distribution to the compartments 12 and 14, whereby the full force of the pressure is prevented from falling on any single wall and distribution of the water is facilitated. The chamber 15 and its extension 15' are provided to receive the air forced upward in compartment 12 as the water rises in the compartments so as to allow the water to rise to the intended maximum level, to build up an air pressure which assists in effecting distribution of the water, and to form an auxiliary reservoir or compartment in which excess water may be temporarily received and surging reduced. The gate 29 is provided to normally close the funnel inlet 23 and to seal the same against escape of water and air during scooping and to allow the air pressure to build up for the purposes described. This gate relieves the cover 24 from the severe pressure to which it otherwise would be subjected in scooping and the liability of the cover being forced open. The counterweight keeps the gate normally closed and the gate in effect acts as a check valve opening under the force of the water when it is taken from a water column but closing against the pressure inside the tank when scooping. The vents in the return bends at the tops of the sets of vent or overflow pipes of comparatively small diameter, which are arranged to allow overflow of water at spaced intervals longitudinally of the tender from the several compartments, are provided to allow escape of air as the water rises and are necessary to prevent the vent pipes, the upper ends of some of which are below the level of the water in the surge tank 15 when full, from acting as syphons to draw water from the tank after the scoop has been raised. During scooping the pipes allow air and excess water to escape and the excess water is discharged at the lower ends of the pipes at such angles as to prevent damage to the running gear of the tender or to the ballast of the trackway, whereby disturbance or washing away of the ballast is avoided.

By the above described construction and arrangement of parts water scooping at all speeds is permitted, and permitted at very high speeds without damage to tender, trackway, or other cars. The construction described, by the use of the check-valve gate 29, also permits of the use of a top filling inlet, for taking water from a water column, on a tender having a high speed scoop, so as to prevent ordinary waste through the inlet while the scoop is being used or loss of water in large quantity due to the forcing open of the inlet cover and the blowing out of water through the inlet.

While the construction of means designed for the stated purpose is preferred, it will, of course, be understood that changes in the form, proportion and arrangement of parts, falling within the scope of the appended claims, may be made without departing from the spirit or sacrificing any of the advantages of the invention.

Having thus described my invention, I claim:

1. In a locomotive tender, a fuel space, a rear water chamber, a front water chamber, side water chambers extending longitudinally of the tender between the rear water chamber and the front water chamber, a water take-up scoop having a forwardly projecting discharge nozzle arranged in the region of the upper forward portion of the rear water chamber, a deflector positioned in front of said nozzle and extending below the level thereof and having sloping surfaces relatively arranged to break the force of the stream of water issuing from the nozzle and to direct the water downwardly into the rear water chamber and laterally toward the side water chambers, and a series of vertical vent pipes arranged at intervals at the sides of the rear water chamber and along the side water chambers and communicating at their upper ends with the upper portions of said chambers and at their lower end with the atmosphere below the tender.

2. In a locomotive tender, a fuel space in the tender, a rear water chamber in the tender back of the fuel space having its forward portion extending under the fuel space and separated therefrom by a wall extending at a forward and downward angle of inclination, the tender also having side water chambers extending forwardly from the rear water chamber, an expansion chamber back of the fuel space disposed over the rear water chamber and communicating therewith, a scoop having a discharge nozzle for delivering water into the rear water chamber, means for intercepting the water issuing from the nozzle and directing the water downwardly into the water chamber and laterally toward the side water chambers, and a series of independent overflow pipes communicating with the respective water chambers and with the expansion chamber and leading therefrom outward from the tender.

3. In a locomotive tender, a fuel space in the tender, a rear water chamber in the tender disposed back of the fuel space, side water chambers extending forwardly from the rear water chamber at opposite sides of the fuel space, bulkheads in the water chambers separating the same into sections in communication with each other through openings in the bulkheads, an expansion chamber comprising a body portion located above the rear water chamber and back of the upper rear portion of the fuel space and having a forward portion extending under said portion of the fuel space and separated therefrom and from the rear water chamber by a wall extending forwardly and downwardly from said body portion of the expansion chamber, a water scoop including a pipe extending upwardly in the rear water chamber and having a forwardly projecting discharge spout at its upper end located in the forward portion of the expansion chamber, a deflector in the rear water chamber located in front of the discharge spout and extending upwardly into the forward portion of the expansion chamber and downwardly into the rear water chamber and operating to deflect water downwardly in said chamber and toward the side water chambers, and a series of independent overflow pipes communicating with the upper portions of the respective water chambers and with the expansion chamber and leading therefrom outwardly from the tender.

4. In a locomotive tender, a fuel space in the tender, a rear water chamber in the tender in rear of the fuel space, a water chamber at each side of the fuel space, a water intake scoop having a delivery pipe extending upwardly in the rear water chamber and provided with a forwardly projecting discharge nozzle, a deflector arranged in front of the nozzle for reducing the force of discharge of the water therefrom and directing the water downwardly into the rear water chamber and laterally toward the side water chambers, and overflow pipes at the sides of the water chamber leading downwardly from the top of the water chamber and outwardly at the bottom of the tender, said pipes having air vents and antisiphon elbows at their upper ends.

5. In a locomotive tender, front and rear water chambers, side water chambers extending longitudinally of the tender between and in communication with the front and rear water chambers, means separating the fuel space from the water chambers, said means including a slope sheet having an upper rear portion arranged above the upper front portion of the rear water chamber, a scoop for delivering water into the tender to fill the water chambers, said scoop including a conductor extending upwardly in the rear water chamber and having a discharge nozzle located adjacent to and below said upper rear portion of the slope sheet, a deflector arranged in the upper front portion of the rear water chamber in front of said nozzle and lying below a part of the upper rear portion of the slope sheet for deflecting water issuing from the nozzle downward into the rear water chamber and laterally toward the side water chambers, and overflow pipes communicating at their upper ends with the chambers and projecting at their lower ends from the bottom of the tender.

6. A locomotive tender having a fuel space, communicating rear, front and side water compartments, said side water compartments being arranged in advance of the rear water compartment and terminating at their rear ends adjacent the front of the rear water compartment, a slope sheet separating the fuel space from the rear water compartment, a vertical transverse bulkhead separating the side water compartments at their rear ends from the forward portion of the rear water compartment below and in advance of the upper rear portion of the slope sheet, said bulkhead having openings therein connecting the rear ends of the side water compartments with the rear water compartment at opposite sides of the forward portion of the latter, a water scoop extending upwardly into the rear water compartment and having at its upper end a discharge nozzle facing said upper rear portion of the slope sheet, and a deflector disposed in front of the nozzle and between the same and adjacent portions of the slope sheet and bulkhead and formed to direct water issuing from the nozzle downwardly and laterally in the rear water compartment immediately in rear of the bulkhead.

7. A locomotive tender having a fuel space, communicating rear, front and side water compartments, said side water compartments being arranged in advance of the rear water compartment, a slope sheet separating the fuel space from the rear water compartment, a vertical transverse bulkhead separating the side water compartments at their rear ends from the forward portion of the rear water compartment, said bulkhead having openings therein connecting the rear ends of the side water compartments with the rear water compartment at opposite sides of the forward portion of the latter, an expansion chamber located above the rear water compartment and communicating at its bottom with the top of said compartment and having a contracted forward portion lying in rear of said upper rear portion of the slope sheet, a water scoop extending upwardly into the rear water compartment and having at its upper end a discharge nozzle disposed in the contracted portion of the expansion chamber and facing said upper rear portion of the slope sheet, and a deflector disposed in front of the nozzle and between the same and adjacent portions of the slope sheet and the bulkhead and formed to direct water issuing from the nozzle downwardly and laterally in the rear water compartment immediately in rear of the bulkhead and toward the open rear ends of the side water compartments.

8. A locomotive tender having a fuel space, communicating rear, front and side water compartments, a slope sheet separating the fuel space from the rear water compartment, a vertical transverse bulkhead separating the side water compartments from the rear water compartment below and in advance of the upper rear portion of the slope sheet, said bulkhead having openings therein connecting the side and rear water compartments, a water scoop extending upwardly into the rear water compartment and having at its upper end a forwardly projecting discharge nozzle underlying a part of said upper rear portion of the slope sheet and facing a part of said rear portion of the slope sheet extending in advance of the nozzle said upper rear portion of the slope sheet, a series of overflow pipes communicating with the respective water compartments and the expansion chamber and leading outwardly from the tender, and a deflector disposed in front of the nozzle and between the same and adjacent portions of the slope sheet and bulkhead and formed to direct water issuing from the nozzle downwardly and laterally in the rear water compartment immediately in rear of the bulkhead.

9. A locomotive tender having a rear water chamber, side water chambers extending forwardly from and communicating at their rear ends with the rear water chamber, a water scoop for taking up water from a track pan, a conductor extending from the scoop upwardly into the tender and having a forwardly projecting discharge nozzle at its upper end disposed in the upper front portion of the rear water chamber, a divider arranged in said portion of the rear water chamber in front of the nozzle and having deflecting surfaces formed and arranged to deflect water issuing from the nozzle downwardly into the rear water chamber and toward the side water chambers, a filling inlet at the top of the tender communicating with the upper rear portion of the rear water chamber, means for closing said inlet against the escape of air and water during a water scooping operation, an expansion chamber having its walls closed above its base against communication through said walls with the atmosphere, said chamber being in communication at its base with the upper rear portion of the rear water chamber and thence extending above the level of the water chamber to permit water and air to rise therein to a level above the maximum level of water and air in the water chambers during a scooping operation and when the filling inlet is closed, whereby in such operation a head pressure in the expansion chamber and upper rear portion of the rear water chamber will be established to assist in effecting a rapid distribution of the water to the several chambers, and a series of overflow pipes arranged at spaced points longitudinally of the tender and communicating at their upper ends with the upper portions of the water and expansion chambers and leading downwardly therefrom and having their lower ends arranged to discharge overflow water below the bottom of the tender.

10. A locomotive tender having a rear water chamber, side water chambers extending forwardly from and communicating at their rear ends with the rear water chamber, a water scoop for taking up water from a track pan, a conductor extending from the scoop upwardly into the tender and having a forwardly projecting discharge nozzle at its upper end disposed in the upper front portion of the rear water chamber, a divider arranged in said portion of the rear water chamber in front of the nozzle and having deflecting surfaces formed and arranged to deflect water issuing from the nozzle downwardly into the rear water chamber and for flow toward the side water chambers, a filling inlet at the top of the tender communicating with the upper portion of the rear water chamber, a closure means for closing said inlet against the escape of air and water during a water scooping operation, an expansion chamber having its walls closed above its base against communication through said walls with the atmosphere, said chamber being in communication at its base with the upper rear portion of the rear water chamber and thence extending above the level of the water chambers to permit water and air to rise therein to a level above the maximum level of water and air in the water chambers during a scooping operation and when the closure means of the filling inlet is closed, whereby in such operation a head pressure in the expansion chamber and upper rear portion of the rear water chamber will be established to assist in effecting a rapid distribution of the water to the respective chambers, and a series of vertical overflow pipes arranged at spaced points longitudinally of the tender, and having downwardly bent inlets at their upper ends communicating with the upper portions of the side water chambers and the expansion chamber, and having their lower ends arranged to discharge air and overflow water below the bottom of the tender, the upper ends of the pipes communicating with the side water chambers being provided with air vents communicating with the atmosphere to prevent siphonage of water through the pipes during a scooping operation.

11. A locomotive tender having a longitudinally extending water containing space, a water scoop for taking up water from a track pan, a conductor extending from the scoop upwardly into the tender and having a forwardly projecting discharge nozzle disposed in the upper portion of the water containing space, means arranged in front of the nozzle to deflect water issuing from the nozzle downwardly into the water containing space, a filling inlet at the top of the tender and communicating with the upper rear portion of the water containing space, a closure means for closing said inlet against the escape of water during a water scooping operation, an expansion chamber having its walls closed above its base against communication through said walls with the atmosphere, said chamber being in communication at its base with the upper rear portion of the water containing space and thence extending to a level above the maximum level of said space to permit water and air to rise therein above the maximum level of water and air in the water containing space during the scooping operation and when the closure means of the filling inlet is closed whereby in such operation a head pressure in the expansion chamber and adjacent portion of the water containing space will be established to assist in effecting a rapid distribution of the water throughout said space, and a series of overflow pipes arranged at spaced points longitudinally of the tender and communicating at their upper ends with the upper portions of the water containing space and expansion chamber and leading downwardly therefrom and having their lower ends arranged to discharge overflow water on the outside of the tender.

12. A locomotive tender having a longitudinally extending water containing space, a water scoop for taking up water from a track pan, a conductor extending from the scoop upwardly into the tender and having a forwardly projecting discharge nozzle disposed in the upper portion of the water containing space, means arranged in front of the nozzle to deflect water issuing from the nozzle downwardly into the water containing space, a filling inlet at the top of the tender and communicating with the upper rear portion of the water containing space, a closure means for closing said inlet against the escape of water during a scooping operation, an expansion chamber having its walls closed above its base against communication, said chamber being in communication with the atmosphere and communicating at its base with the upper rear portion of the water containing space and thence extending to a level above the maximum level of said space to permit water and air to rise therein above the maximum level of water and air in the water containing space during a scooping operation and when the closure means of the filling inlet is closed, whereby in such operation a head pressure in the expansion chamber and adjacent portion of the water containing space will be established to assist in effecting a rapid distribution of the water throughout said space, and a series of overflow pipes arranged at spaced points longitudinally of the tender and communicating at their upper ends with the upper portions of the water containing space and expansion chamber and leading downwardly therefrom and having their lower ends extending beneath the tender and operatively formed and arranged to discharge the overflow water laterally beyond the sides of the tender.

13. A locomotive tender having a water containing space extending substantially from end to end thereof, a scoop for taking up water from a track pan and having an outlet arranged to deliver the water to the water space at a point intermediate the length of said space, a water supply inlet communicating with the water space rearwardly of the scoop for filling the water space from an overhead source of water supply, means for closing said inlet against the escape of air or water therethrough from the water space during a water scooping operation, and a plurality of vent devices located forwardly of the scoop and communicating with the water space above the maximum water level line for discharging air and excess water therefrom in a filling operation.

14. A locomotive tender having a water containing space extending substantially from end to end thereof, a scoop for taking up water from a track pan and having an outlet arranged to deliver the water to the water space at a point intermediate the length of said space, a water supply inlet communicating with the water space rearwardly of the scoop for filling the water space from an overhead source of water supply, means for closing said inlet against the escape of air or water therethrough from the water space during a water scooping operation, a plurality of vent devices communicating with the water space in rear of the scoop above the maximum water level line of said space for discharging air and excess water from such portion of the space in a filling operation, and a plurality of vent devices located forwardly of the scoop and communicating with the water space above the maximum water level line for discharging air and excess water therefrom in a filling operation.

15. A locomotive tender having a water containing space extending substantially from end to end thereof, a scoop for taking up water from a track pan and having an outlet arranged to deliver the water to the water space at a point intermediate the length of said space, a water supply inlet communicating with the water space rearwardly of the scoop for filling the water space from an overhead source of water supply, means for closing said inlet against the escape of air or water therethrough from the water space during a water scooping operation, an expansion chamber extending above the level of the water space at the rear of the tender between the scoop inlet and water supply inlet, said chamber being in communication at its base with the water space but having its walls closed above its base against the escape of air or water to the atmosphere through said walls, a set of vent devices communicating with the water space in rear of the scoop outlet above the maximum water line level of said space, a set of vent devices communicating with the top of the expansion chamber above its maximum water line level, said sets of vent devices serving to discharge air and excess water from said portion of the space and from the expansion chamber in a filling operation, and a plurality of vent devices located forwardly of the scoop and communicating with the water space above the maximum water level line for discharging air and excess water therefrom in a filling operation.

16. A locomotive tender having a longitudinally extending water space, a scoop for taking up water from a track pan and having a discharge nozzle, said space including a rear water chamber into the forward portion of which the nozzle is arranged to discharge and a side water chamber located forwardly of the discharge nozzle, a water supply inlet extending into the top of the rear water chamber for filling the water space from an overhead source of supply, means for closing said inlet against the escape of air or water therethrough from the water space during a water scooping operation, and a plurality of vent devices arranged at spaced intervals longitudinally of the tender rearwardly and forwardly of the scoop nozzle and communicating with the water chambers above the maximum water level line of the water space for discharging air and excess water from said chambers during a scooping operation.

17. A locomotive tender having a water chamber, a top filling inlet for delivering water into the water chamber, a scoop for delivering water from a track pan into the water chamber, means for normally closing said inlet and maintaining it in closed condition when the scoop is in operation, an expansion chamber extending upwardly from the top of the water chamber, said expansion chamber being independent of the filling inlet and having its walls closed above its base against the escape of air or water therefrom and being in communication at its base with the upper portion of the water chamber, and independent vent devices communicating respectively with the upper portions of the water and expansion chambers for venting air from the chambers and venting water therefrom when the water rises above predetermined levels in the respective chambers.

18. A locomotive tender having a water chamber, a scoop for taking up water from a track pan and delivering the water into the chamber, an expansion chamber extending upwardly from the top of the water chamber, said expansion chamber being in communication at its base with the water chamber and having its walls closed above its base against the escape of air or water to the atmosphere through said walls so as to receive and confine air and water therein as the water rises in the water chamber during a scooping action, and independent vertical vent pipes communicating at their upper ends respectively with the upper portions of the water and expansion chambers for venting air from the chambers and venting water therefrom when the air rises above predetermined levels in the respective chambers, said pipes having their lower ends arranged to discharge below and outwardly beyond the bottom of the tender.

CARL F. KANTOLA.

REFERENCES CITED

The following references are of record in the file of this patent:

UNITED STATES PATENTS

| Number | Name | Date |
|---|---|---|
| 1,640,037 | Johnson | Aug. 23, 1927 |
| 1,731,101 | Hicken | Oct. 8, 1929 |
| 1,879,371 | McCloskey | Sept. 27, 1932 |
| 2,104,132 | McGillicuddy et al. | Jan. 4, 1938 |

FOREIGN PATENTS

| Number | Country | Date |
|---|---|---|
| 17,053 of 1903 | Great Britain | May 19, 1904 |